(12) United States Patent
Que et al.

(10) Patent No.: US 9,052,431 B2
(45) Date of Patent: Jun. 9, 2015

(54) BACKLIGHT MODULE AND LIQUID DISPLAY DEVICES WITH THE SAME

(75) Inventors: Chengwen Que, Guandong (CN); Shih Hsiang Chen, Guandong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 219 days.

(21) Appl. No.: 13/642,528

(22) PCT Filed: Sep. 7, 2012

(86) PCT No.: PCT/CN2012/081135
§ 371 (c)(1),
(2), (4) Date: Oct. 21, 2012

(87) PCT Pub. No.: WO2014/036723
PCT Pub. Date: Mar. 13, 2014

(65) Prior Publication Data
US 2014/0063844 A1    Mar. 6, 2014

(30) Foreign Application Priority Data
Sep. 4, 2012  (CN) .......................... 2012 1 0323548

(51) Int. Cl.
| G09F 13/04 | (2006.01) |
| G09F 13/08 | (2006.01) |
| F21V 3/00 | (2006.01) |
| F21V 5/00 | (2006.01) |
(Continued)

(52) U.S. Cl.
CPC .............. *G02B 6/009* (2013.01); *G02B 6/0088* (2013.01); *G02F 1/133615* (2013.01); *G02F 2001/133322* (2013.01)

(58) Field of Classification Search
CPC .. G02B 6/0086; G02B 6/0088; G02B 6/0085; G02B 6/0028; G02B 6/002; G06F 13/18; G06F 1/133615
USPC ........ 362/97.1, 97.3, 311.01, 311.02, 311.06, 362/615, 628, 632, 633, 634, 812; 349/58, 349/61, 62, 65, 67
See application file for complete search history.

(56) References Cited

U.S. PATENT DOCUMENTS 5,664,862 A * 9/1997 Redmond et al. ............. 362/625
5,729,310 A * 3/1998 Horiuchi et al. ................ 349/62
(Continued)

OTHER PUBLICATIONS

Translation of WO 2012/039196 A1, Inventor Kuromizu, published Mar. 29, 2012.*

*Primary Examiner* — Jong-Suk (James) Lee
*Assistant Examiner* — Erin Kryukova
(74) *Attorney, Agent, or Firm* — Andrew C. Cheng

(57) ABSTRACT

A backlight module and a liquid crystal device are disclosed. The backlight module includes a plastic frame, an aluminum extrusion, and a light guiding plate. The plastic frame and the aluminum extrusion prohibit the light guiding plate from moving in an up and down direction. Wherein the light guiding plate is disposed on the aluminum extrusion. The light guiding plate includes a body, and a first position portion extends along the body towards the aluminum extrusion. The aluminum extrusion includes a position slot corresponding to the first position portion, and the first position portion closely engages with the first position slot. The backlight module and the liquid crystal device fix the light guiding plate by engaging the light guiding plate, the aluminum extrusion, and the plastic frame so that the light guiding plate is stably fixed and the light coupling is stable.

14 Claims, 3 Drawing Sheets

(51) Int. Cl.
  *F21V 7/04*   (2006.01)
  *F21V 8/00*   (2006.01)
  *G02F 1/1335*   (2006.01)
  *G02F 1/1333*   (2006.01)

(56) References Cited

U.S. PATENT DOCUMENTS

| | | | |
|---|---|---|---|
| 5,988,827 A * | 11/1999 | Lee | 362/633 |
| 6,443,583 B1 * | 9/2002 | Ha | 362/608 |
| 6,905,214 B2 * | 6/2005 | Tani | 353/56 |
| 6,942,374 B2 * | 9/2005 | Lee | 362/615 |
| 7,102,705 B2 * | 9/2006 | Kim et al. | 349/65 |
| 7,182,499 B2 * | 2/2007 | Chen et al. | 362/621 |
| 7,188,989 B2 * | 3/2007 | Miyashita | 362/621 |
| 7,287,892 B1 * | 10/2007 | Pang et al. | 362/604 |
| 7,301,588 B2 * | 11/2007 | Ogawa | 349/58 |
| 7,611,274 B2 * | 11/2009 | Hsiao et al. | 362/634 |
| 7,808,576 B2 * | 10/2010 | Takahashi et al. | 349/65 |
| 7,893,374 B2 * | 2/2011 | Aihara et al. | 200/314 |
| 8,049,839 B2 * | 11/2011 | Han et al. | 349/65 |
| 8,118,465 B2 * | 2/2012 | Kunimochi et al. | 362/612 |
| 8,134,658 B2 * | 3/2012 | Shiraishi | 349/65 |
| 8,167,474 B2 * | 5/2012 | Tanoue et al. | 362/607 |
| 8,228,464 B2 * | 7/2012 | Mifune et al. | 349/67 |
| 8,632,240 B2 * | 1/2014 | Tang et al. | 362/634 |
| 8,651,725 B2 * | 2/2014 | Ie et al. | 362/616 |
| 8,777,439 B2 * | 7/2014 | Kuromizu | 362/97.4 |
| 8,858,055 B2 * | 10/2014 | Gu et al. | 362/613 |
| 2007/0127263 A1 * | 6/2007 | Chang | 362/610 |
| 2007/0165425 A1 * | 7/2007 | Sakamoto et al. | 362/633 |
| 2009/0229154 A1 * | 9/2009 | Sadon | 40/546 |
| 2009/0268122 A1 * | 10/2009 | Takahashi | 349/58 |
| 2011/0085107 A1 * | 4/2011 | Noh et al. | 349/61 |
| 2011/0157908 A1 * | 6/2011 | Iwai et al. | 362/509 |
| 2012/0002441 A1 * | 1/2012 | Yabe et al. | 362/607 |

* cited by examiner

BACKLIGHT MODULE AND LIQUID DISPLAY DEVICES WITH THE SAME

BACKGROUND OF THE INVENTION

1. Field of the Invention

Embodiments of the present disclosure relate to display technology, and more particularly to a backlight module and a liquid display device with the same.

2. Discussion of the Related Art

Backlight module is a key component of liquid crystal devices. The backlight module is for providing lights with sufficient brightness and uniform distribution so that the liquid crystal device may display images. Referring to FIG. 1, the conventional backlight module includes a light source 11, a light guiding plate 12, a reflective sheet 13, an optical film 14, a plastic frame 15, an aluminum extrusion 16, and a backplane 17. The light guiding plate 12 is arranged above the aluminum extrusion 16. The light source 11 is arranged above the aluminum extrusion 16 and is on a first side of the light guiding plate 12. A groove 121 is arranged in a second side of the light guiding plate 12. The second side of the light guiding plate 12 is farther from the light source 11 than the first side. The groove 121 engages with a position pillar 171 arranged on the backplane 17 so as to locate the light guiding plate 12. However, the gap between the position pillar 171 and the groove 121 and the location deviation on the backplane 17 of the position pillar 171 may result in instability of light coupling. As such, the light utilization of the backlight module is not stable and the brightness of the liquid crystal panel is also not stable.

SUMMARY

The object of the claimed invention is to provide a backlight module and a liquid crystal device with stable light coupling.

A backlight module includes a plastic frame, an aluminum extrusion, and a light guiding plate. The plastic frame and the aluminum extrusion prohibit the light guiding plate from moving in an up and down direction. wherein the light guiding plate is disposed on the aluminum extrusion, the light guiding plate includes a body. A first position portion extends along the body towards the aluminum extrusion, and a second position portion extends from the body towards the plastic frame. The aluminum extrusion includes a position slot corresponding to the first position portion, and the first position portion closely engages with the first position slot, the plastic frame includes a contact portion corresponding to the second position portion. The second position portion closely abuts against the contact portion.

The first position portion includes a first tilt surface extending from a bottom of the body toward a bottom edge of the light incident surface. The first tilt surface includes a first edge and a second edge. The first edge is farther from the light source than the second edge, and the first edge of the first tilt surface connects with the bottom edge of the light incident surface via the bottom surface of the first position portion.

The position slot includes a bottom wall, and a first sidewall and a second sidewall arranged in two sides of the bottom wall. Wherein the first sidewall is parallel to the first tilt surface, the second sidewall is parallel to the light incident surface, and the bottom wall is parallel to the bottom surface of the first position portion.

Wherein the first sidewall closely abuts against the first tilt surface, the second sidewall closely abuts against the light incident surface, and the bottom wall closely abuts against the bottom surface.

Wherein the backlight module further includes a reflective sheet arranged between the bottom of the body and the aluminum extrusion, and the reflective sheet also spans the first sidewall of the aluminum extrusion.

In another aspect, a backlight module includes a plastic frame, an aluminum extrusion, and a light guiding plate.

The plastic frame and the aluminum extrusion prohibit the light guiding plate from moving in an up and down direction. Wherein the light guiding plate is disposed on the aluminum extrusion. The light guiding plate includes a body, and a first position portion extends along the body towards the aluminum extrusion.

The aluminum extrusion includes a position slot corresponding to the first position portion, and the first position portion closely engages with the first position slot.

Wherein the first position portion includes a first tilt surface extending from a bottom of the body towards a bottom edge of the light incident surface. The first tilt surface includes a first edge and a second edge. The first edge is farther from the light source than the second edge. The first edge of the first tilt surface connects with the bottom edge of the light incident surface via the bottom surface of the first position portion. The position slot includes a bottom wall, and a first sidewall and a second sidewall arranged in two sides of the bottom wall, wherein the first sidewall is parallel to the first tilt surface, the second sidewall is parallel to the light incident surface, and the bottom wall is parallel to the bottom surface of the first position portion. Wherein the first sidewall closely abuts against the first tilt surface, the second sidewall closely abuts against the light incident surface, and the bottom wall closely abuts against the bottom surface.

Wherein the backlight module further includes a reflective sheet arranged between the bottom of the body and the aluminum extrusion, and the reflective sheet also spans the first sidewall of the aluminum extrusion.

Wherein the first position portion includes a first tilt surface extending from a bottom of the body towards a bottom edge of the light incident surface, the first tilt surface includes a first edge and a second edge, the first edge is farther from the light source than the second edge, the first edge of the first tilt surface connects with the bottom edge of the light incident surface via the bottom surface of the first position portion. The position slot includes a first sidewall and a second sidewall, the first sidewall is parallel to the first tilt surface, the second sidewall is parallel to the light incident surface, and the first sidewall and the second sidewall intersects with each other in the bottom of the first position slot; and wherein the first sidewall closely abuts against the first tilt surface, and the second sidewall closely abuts against the light incident surface.

Wherein the light guiding plate further includes a second position portion extending from the body towards the plastic frame, the plastic frame has a contact portion corresponding to the second position portion, and the second position portion closely abuts against the contact portion.

Wherein the second position portion includes a second tilt surface extending from a top of the body towards the top edge of the light incident surface, the contact portion includes a contact surface parallel to the second tilt surface, and the contact surface closely abuts against the second tilt surface.

Wherein the backlight module further includes a buffer material with reflective attribute, the buffer material is arranged between the contact surface of the plastic frame and the second tilt surface of the light guiding plate.

Wherein the first position portion and the second position portion are formed by injection molding, and are symmetrically arranged along a length of light guiding plate.

Wherein the backlight module includes a light source arranged on the sidewall above the aluminum extrusion, and the sidewall faces toward the light incident surface of the light guiding plate.

In another aspect, a liquid crystal device, includes a backlight module includes a plastic frame, an aluminum extrusion, and a light guiding plate. The plastic frame and the aluminum extrusion prohibit the light guiding plate from moving in an up and down direction, wherein the light guiding plate is disposed on the aluminum extrusion, the light guiding plate includes a body, and a first position portion extends along the body towards the aluminum extrusion.

The aluminum extrusion includes a position slot corresponding to the first position portion, and the first position portion closely engages with the first position slot.

Wherein the first position portion includes a first tilt surface extending from a bottom of the body towards a bottom edge of the light incident surface, the first tilt surface includes a first edge and a second edge, the first edge is farther from the light source than the second edge, the first edge of the first tilt surface connects with the bottom edge of the light incident surface via the bottom surface of the first position portion; the position slot includes a bottom wall, and a first sidewall and a second sidewall arranged in two sides of the bottom wall, wherein the first sidewall is parallel to the first tilt surface, the second sidewall is parallel to the light incident surface, the bottom wall is parallel to the bottom surface of the first position portion; wherein the first sidewall closely abuts against the first tilt surface, the second sidewall closely abuts against the light incident surface, and the bottom wall closely abuts against the bottom surface.

Wherein the backlight module further includes a reflective sheet arranged between the bottom of the body and the aluminum extrusion, and the reflective sheet also spans the first sidewall of the aluminum extrusion.

Wherein the first position portion includes a first tilt surface extending from a bottom of the body towards a bottom edge of the light incident surface, the first tilt surface includes a first edge and a second edge, the first edge is farther from the light source than the second edge, the first edge of the first tilt surface connects with the bottom edge of the light incident surface via the bottom surface of the first position portion; the position slot includes a first sidewall and a second sidewall, the first sidewall is parallel to the first tilt surface, the second sidewall is parallel to the light incident surface, and the first sidewall and the second sidewall intersects with each other in the bottom of the first position slot; and wherein the first sidewall closely abuts against the first tilt surface, and the second sidewall closely abuts against the light incident surface.

Wherein the light guiding plate further includes a second position portion extending from the body towards the plastic frame, the plastic frame has a contact portion corresponding to the second position portion, and the second position portion closely abuts against the contact portion.

Wherein the second position portion includes a second tilt surface extending from a top of the body towards the top edge of the light incident surface, the contact portion includes a contact surface parallel to the second tilt surface, and the contact surface closely abuts against the second tilt surface.

Wherein the backlight module further includes a buffer material with reflective attribute, the buffer material is arranged between the contact surface of the plastic frame and the second tilt surface of the light guiding plate.

Wherein the first position portion and the second position portion are formed by injection molding, and are symmetrically arranged along a length of light guiding plate.

Wherein the backlight module includes a light source arranged on the sidewall above the aluminum extrusion, and the sidewall faces toward the light incident surface of the light guiding plate.

The backlight module and the liquid crystal device fix the light guiding plate by engaging the light guiding plate, the aluminum extrusion, and the plastic frame so that the light guiding plate is stably fixed and the light coupling is stable. The structure of the backlight module is simple, and the manufacturing cost is reduced by omitting the position assembly for the light guiding plate.

DETAILED DESCRIPTION OF THE EMBODIMENTS

Embodiments of the invention will now be described more fully hereinafter with reference to the accompanying drawings, in which embodiments of the invention are shown.

Figure 1:
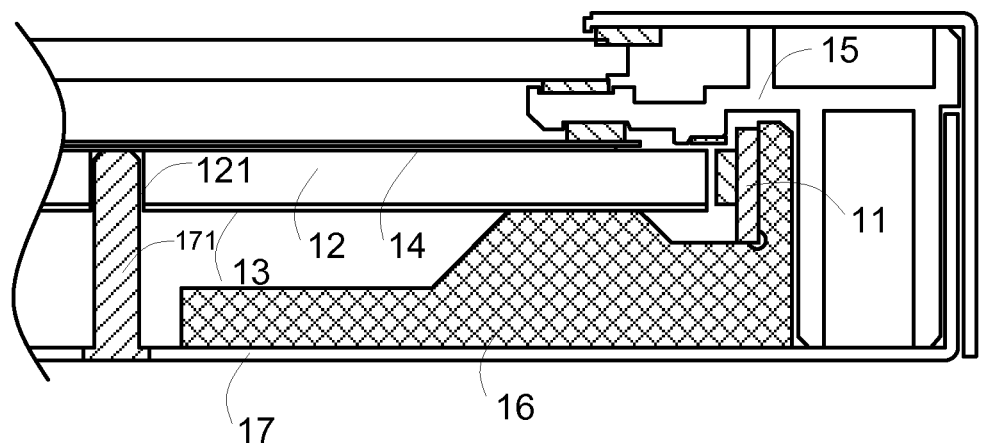
FIG. 1 is a cross-sectional view of a conventional backlight module.
Figure 2:
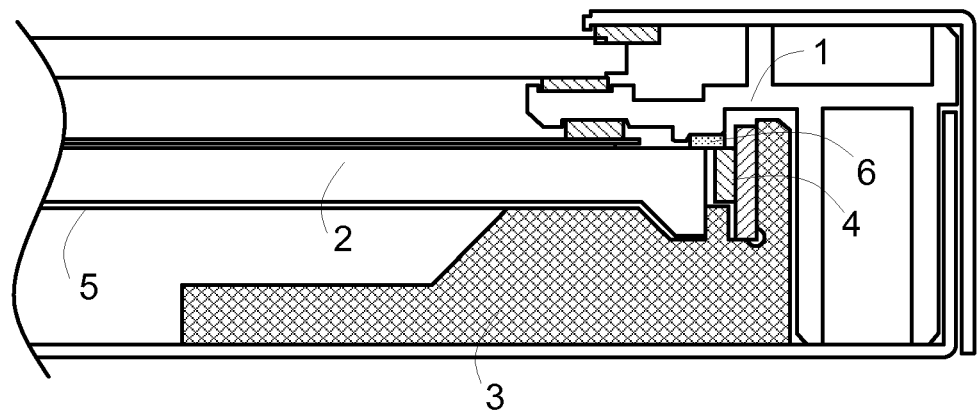
FIG. 2 is a cross-sectional view of the backlight module in accordance with a first embodiment of the claimed invention.

Referring to FIG. 2, in one embodiment, the backlight module includes a plastic frame 1, a light guiding plate 2, an aluminum extrusion 3, a light source 4, and a reflective sheet 5.

The plastic frame 1 and the aluminum extrusion 3 prohibit the light guiding plate 2 from moving in an up and down direction. The light guiding plate 2 is disposed on the aluminum extrusion 3. The light source 4 is arranged above the aluminum extrusion 3, and is arranged in the right side of the light guiding plate 2. The reflective sheet 5 is arranged between the light guiding plate 2 and the aluminum extrusion 3.

Figure 3:
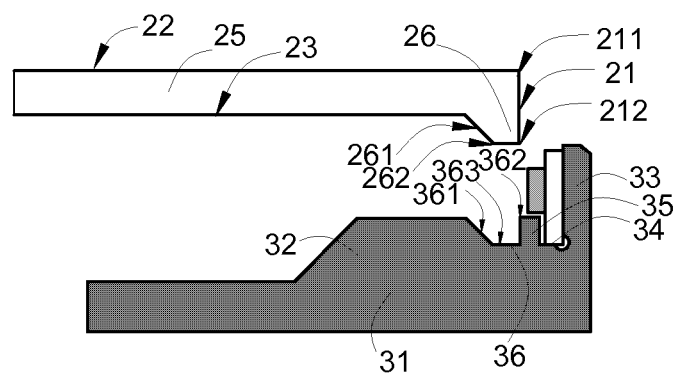
FIG. 3 is a cross-sectional view of the light guiding plate and the aluminum extrusion of FIG. 2 before assembled.

Also referring to FIG. 3, the light guiding plate 2 includes a light incident surface 21, a light emitting surface 22, a bottom surface 23, a body 25, and a first position portion 26 extends along the body 25 towards the aluminum extrusion 3. The light incident surface 21 includes a top edge 211 and a bottom edge 212. The light emitting surface 22 connects with the top edge 211 of the light incident surface 21. The bottom surface 23 connects with the bottom edge 212 of the light incident surface 21. The light emitting surface 22 is opposite to the bottom surface 23. The light incident surface 21 receives the lights from the light source 4, and guides the lights to the light guiding plate 2. The light emitting surface 22 then guides the lights towards the light guiding plate 2.

The aluminum extrusion 3 has a first position slot 36 corresponding to the first position portion 26. The first position portion 26 closely engages with the first position slot 36 so as to fasten the light guiding plate 2.

Specifically, the first position portion 26 includes a first tilt surface 261 and a bottom surface 262. The first tilt surface 261 extends from a bottom of the body 25 towards the bottom edge 212 of the light incident surface 21. The first tilt surface 261 includes a first edge and a second edge, and the first edge is farther than the second edge with respect to the light source 4. The first edge of the first tilt surface 261 connects with the bottom edge 212 of the light incident surface 21 via the bottom surface 262 of the first position portion 26.

The first position slot 36 includes a bottom wall 363, and a first sidewall 361 and a second sidewall 362 respectively arranged on two sides of the bottom wall 363. The bottom wall 363 connects with the first sidewall 361 and the second sidewall 362. The first sidewall 361 is parallel to the first tilt surface 261. The second sidewall 362 is parallel to the light incident surface 21. The bottom wall 363 is parallel to the bottom surface 262. The first sidewall 361 closely abuts against the first tilt surface 261, the second sidewall 362 closely abuts against the light incident surface 21, and the bottom wall 363 closely abuts against the bottom surface 262.

In the embodiment, the first position portion 26 has a substantially trapezoid-shaped cross section.

In the embodiment, the reflective sheet 5 is arranged between the bottom of the body 25 and the aluminum extrusion, and the reflective sheet 5 also spans the first sidewall 361 of the aluminum extrusion 3. In real scenarios, the reflective sheet 5 may span the first tilt surface 261 of the first position portion 26 to guide leaked lights towards the light guiding plate 2. In this way, the light utilization is enhanced and such arrangement provides a buffer effect for the light guiding plate 2.

Preferably, in the embodiment, the backlight module includes a buffer material 6. The buffer material 6 is arranged between the plastic frame 1 and the light guiding plate 2. The buffer material 6 presses the light emitting surface 22 of the light guiding plate 2 together with the plastic frame 1 so that the first position portion 26 may closely abut against the first position slot 36. As such, the stability of the light guiding plate is enhanced, and the buffer material 6 provides the buffer effect for the light guiding plate 2 at the same time.

In the embodiment, the aluminum extrusion 3 includes a bottom portion 31, a top portion 32, a side potion 33, an installation slot 34, and a protrusion 35. The raised top portion 32 is arranged above the bottom portion 31 to support the body 25. The side potion 33 is vertical to the bottom portion 31 and is arranged on one side of the bottom portion 31. The light source 4 is arranged on the side potion 33. The first position slot 36 and the installation slot 34 are spaced by a distance and are arranged on the top portion 32. The protrusion 35 is arranged between the first position slot 36 and the installation slot 34. Furthermore, the protrusion 35 is arranged between the light source 4 and the light guiding plate 2. The protrusion 35 also abuts against the light incident surface 21 to prevent the light guiding plate 2 from being damaged due to being too close to the light source 4. In the embodiment, the protrusion 35 contacts with the area of the light guiding plate 2 that are not exposed to the light. Thus, the protrusion 35 has not contacted an active area of the light incident surface 21 of the light guiding plate so that emitting effect of the backlight module is not affected.

Figure 4:
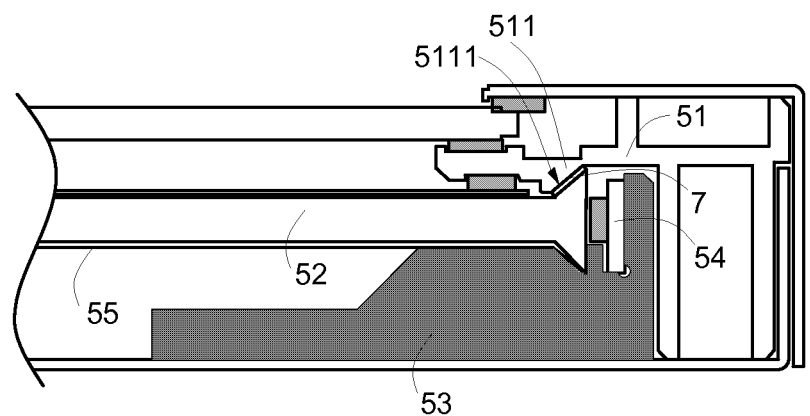
FIG. 4 is a cross-sectional view of the backlight module in accordance with a second embodiment of the claimed invention.

Referring to FIG. 4, in a second embodiment, the backlight module includes a plastic frame 51, a light guiding plate 52, a light source 54, and a reflective sheet 55. The light source 54, the reflective sheet 55 is substantially similar to the light source 4 and the reflective sheet 5 in the first embodiment.

Figure 5:
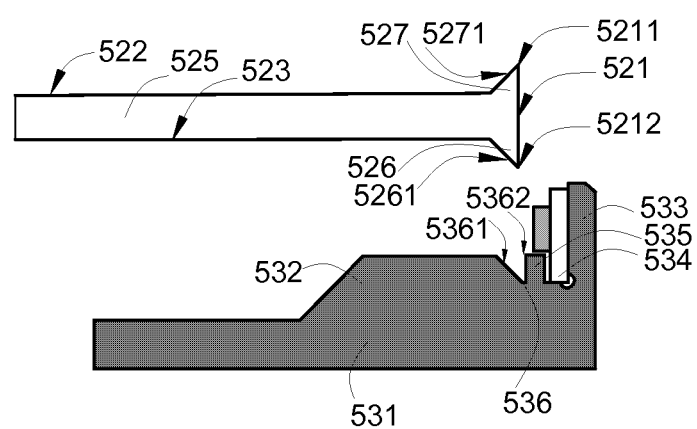
FIG. 5 a cross-sectional view of the light guiding plate and the aluminum extrusion of FIG. 4 before assembled.

Referring to FIG. 5, the light guiding plate 52 includes a light incident surface 521, a light emitting surface 522, a bottom surface 523, a body 525, and a first position portion 526 extends along the body 525 towards an aluminum extrusion 53.

The aluminum extrusion 53 has a first position slot 536 corresponding to the first position portion 526. The first position portion 526 closely engages with the first position slot 536 so as to fasten the light guiding plate 52.

Specifically, the first position portion 526 includes a first tilt surface 5261 extending from a bottom of the body 525 towards the bottom edge 5212 of the light incident surface 521. A first edge of the first tilt surface 5261 connects with the bottom edge 5212 of the light incident surface 521. The first position slot 536 includes a first sidewall 5361 and a second sidewall 5362. The first sidewall 5361 is parallel to the first tilt surface 5261, and the second sidewall 5362 is parallel to the light incident surface 521. The first sidewall 5361 and the second sidewall 5362 intersect with each other in the bottom of the first position slot 536. The first sidewall 5361 closely abuts against the first tilt surface 5261, and the second sidewall 5362 closely abuts against the light incident surface 521.

In the embodiment, the first position portion 526 has a substantially triangle-shaped cross section. In other embodiments, the first position portion 526 may have, but not limited to, a substantially rectangular-shaped cross section.

In the embodiment, the light guiding plate 52 includes a second position portion 527 extends from the body 525 towards the plastic frame 51. The first position portion 526 and the second position portion 527 are formed by injection molding. The plastic frame 51 has a contact portion 511 corresponding to the second position portion 527. The second position portion 527 closely abuts against the contact portion 511 to enhance the stability of the light guiding plate.

Specifically, the second position portion 527 includes a second tilt surface 5271 extending from a top of the body 525 towards the top edge 5211 of the light incident surface 521. The contact portion 511 includes a contact surface 5111. The contact surface 5111 is parallel to the second tilt surface 5271, and the contact surface 5111 closely abuts against the second tilt surface 5271.

Preferably, the second position portion 527 and the first position portion 526 are symmetrically arranged along a length of light guiding plate 52 to enhance the stability of the light guiding plate 52.

Furthermore, the backlight module includes a buffer material 7 arranged between the contact surface 5111 of the plastic frame 51 and the second tilt surface 5271 of the light guiding plate 52 for providing the buffer effect. In real applications, the buffer material 7 may be arranged on the plastic frame 51, or on the light guiding plate 52. The buffer material 7 may be made by different materials, such as silica gel, rubbers, and so on. The buffer material 7 may be arranged on the plastic frame 51 or the light guiding plate 52 by different methods. For example, the buffer material 7 may be arranged on the plastic frame 51 or the light guiding plate 52 by a twin adhesive. Alternatively, slots may be formed on the plastic frame 51 or the light guiding plate 52 so that the buffer material 7 may be engaged with the slots.

In the embodiments, preferably, the buffer material 7 may be buffer materials with reflective attribute so that the buffer material 7 may guide the leaked lights from the second tilt surface 5271 towards the light guiding plate 52. Thus, the light utilization is enhanced.

Referring to FIG. 5, in the embodiment, the aluminum extrusion 53 includes a bottom portion 531, a top portion 532, a side portion 533, an installation slot 534, and a protrusion 535.

In the embodiment, the bottom portion 531, the top portion 532, the side portion 533, the installation slot 534, and the protrusion 535 are substantially the same with those disclosed in the first embodiment.

In one embodiment, a liquid crystal device includes the backlight module disclosed in the above embodiments.

The backlight module and the liquid crystal device fix the light guiding plate by engaging the light guiding plate, the aluminum extrusion, and the plastic frame so that the light guiding plate is stably fixed and the light coupling is stable. The structure of the backlight module is simple, and the manufacturing cost is reduced by omitting the position assembly for the light guiding plate.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module, comprising:
   a plastic frame;
   an aluminum extrusion comprising a protrusion being arranged between a first position slot and an installation slot of the aluminum extrusion;
   a light guiding plate;
   the plastic frame and the aluminum extrusion prohibit the light guiding plate from moving in an up and down direction, wherein the light guiding plate is disposed on the aluminum extrusion, the light guiding plate comprises a body, and a first position portion extends along the body towards the aluminum extrusion; and
   the first position slot of the aluminum extrusion corresponding to the first position portion of the light guiding plate, and the first position portion of the light guiding plate closely engages with the first position slot of the aluminum extrusion, and the protrusion of the aluminum extrusion is arranged between a light source and the light guiding plate;
   the first position portion comprises a first tilt surface extending from a bottom of the body towards a bottom edge of a light incident surface, the first tilt surface comprises a first edge and a second edge, the first edge is farther from the light source than the second edge, the first edge of the first tilt surface connects with the bottom edge of the light incident surface via a bottom surface of the first position portion;
   the first position slot comprises a bottom wall, and a first sidewall and a second sidewall arranged in two sides of the bottom wall, wherein the first sidewall is parallel to the first tilt surface, the second sidewall is parallel to the light incident surface, the bottom wall is parallel to the bottom surface of the first position portion; and
   wherein the first sidewall closely abuts against the first tilt surface, the second sidewall closely abuts against the light incident surface, and the bottom wall closely abuts against the bottom surface of the first position portion.

2. The backlight module as claimed in claim 1, wherein the backlight module further comprises a reflective sheet arranged between the bottom of the body and the aluminum extrusion, and the reflective sheet also spans the first sidewall of the aluminum extrusion.

3. The backlight module as claimed in claim 1, wherein the backlight module comprises a light source arranged on a sidewall above the aluminum extrusion, and the sidewall faces toward a light incident surface of the light guiding plate.

4. A liquid crystal device, comprising:
   a backlight module comprising a plastic frame, an aluminum extrusion, and a light guiding plate, the plastic frame and the aluminum extrusion prohibit the light guiding plate from moving in an up and down direction, wherein the light guiding plate is disposed on the aluminum extrusion, the light guiding plate comprises a body, and a first position portion extends along the body towards the aluminum extrusion; and
   the first position slot of the aluminum extrusion corresponding to the first position portion, and the first position portion of the light guiding plate closely engages with the first position slot of the aluminum extrusion, and a protrusion of the aluminum extrusion is arranged between a light source and the light guiding plate;
   the first position portion comprises a first tilt surface extending from a bottom of the body towards a bottom edge of a light incident surface, the first tilt surface comprises a first edge and a second edge, the first edge is farther from the light source than the second edge, the first edge of the first tilt surface connects with the bottom edge of the light incident surface via a bottom surface of the first position portion;
   the first position slot comprises a bottom wall, and a first sidewall and a second sidewall arranged in two sides of the bottom wall, wherein the first sidewall is parallel to the first tilt surface, the second sidewall is parallel to the light incident surface, the bottom wall is parallel to a bottom surface of the first position portion; and
   wherein the first sidewall closely abuts against the first tilt surface, the second sidewall closely abuts against the light incident surface, and the bottom wall closely abuts against the bottom surface of the first position portion.

5. The liquid crystal device as claimed in claim 4, wherein the backlight module further comprises a reflective sheet arranged between the bottom of the body and the aluminum extrusion, and the reflective sheet also spans the first sidewall of the aluminum extrusion.

6. The liquid crystal device as claimed in claim 4, wherein the backlight module comprises a light source arranged on a sidewall above the aluminum extrusion, and the sidewall faces toward a light incident surface of the light guiding plate.

7. A backlight module, comprising:
   a plastic frame;
   an aluminum extrusion comprising a protrusion being arranged between a first position slot and an installation slot of the aluminum extrusion;
   a light guiding plate;
   wherein the plastic frame and the aluminum extrusion prohibit the light guiding plate from moving in an up and down direction, wherein the light guiding plate is disposed on the aluminum extrusion, the light guiding plate comprises a body, and a first position portion extends along the body towards the aluminum extrusion;
   the first position slot of the aluminum extrusion corresponding to the first position portion of the light guiding plate, and the first position portion of the light guiding plate closely engaging with the first position slot of the aluminum extrusion, and the protrusion of the aluminum extrusion being arranged between a light source and the light guiding plate
   wherein the first position portion comprises a first tilt surface extending from a bottom of the body towards a bottom edge of a light incident surface, the first tilt surface comprises a first edge and a second edge, the first edge is farther from the light source than the second edge, the first edge of the first tilt surface connects with the bottom edge of the light incident surface via the bottom surface of the first position portion;

wherein the first position slot comprises a first sidewall and a second sidewall, the first sidewall is parallel to the first tilt surface, the second sidewall is parallel to the light incident surface, and the first sidewall and the second sidewall intersect with each other in a bottom of the first position slot;

wherein the first sidewall closely abuts against the first tilt surface, and the second sidewall closely abuts against the light incident surface; and wherein the light guiding plate further comprises a second position portion extending from the body towards the plastic frame, the plastic frame has a contact portion corresponding to the second position portion, and the second position portion closely abuts against the contact portion.

8. The backlight module as claimed in claim 7, wherein the second position portion includes a second tilt surface extending from a top of the body towards a top edge of the light incident surface, the contact portion comprises a contact surface parallel to the second tilt surface, and the contact surface closely abuts against the second tilt surface.

9. The backlight module as claimed in claim 8, wherein the backlight module further comprises a buffer material with reflective attribute, the buffer material is arranged between the contact surface of the plastic frame and the second tilt surface of the light guiding plate.

10. The backlight module as claimed in claim 7, wherein the first position portion and the second position portion are formed by injection molding, and are symmetrically arranged along a length of the light guiding plate.

11. A liquid crystal device, comprising:
a backlight module comprising a plastic frame, an aluminum extrusion, and a light guiding plate, the plastic frame and the aluminum extrusion prohibit the light guiding plate from moving in an up and down direction, wherein the light guiding plate is disposed on the aluminum extrusion, the light guiding plate comprises a body, and a first position portion extends along the body towards the aluminum extrusion;

the first position slot of the aluminum extrusion corresponding to the first position portion, and the first position portion of the light guiding plate closely engages with the first position slot of the aluminum extrusion, and a protrusion of the aluminum extrusion is arranged between a light source and the light guiding plate;

wherein the first position portion comprises a first tilt surface extending from a bottom of the body towards a bottom edge of a light incident surface, the first tilt surface comprises a first edge and a second edge, the first edge is farther from the light source than the second edge, the first edge of the first tilt surface connects with the bottom edge of the light incident surface via a bottom surface of the first position portion;

the first position slot comprising a first sidewall and a second sidewall, the first sidewall being parallel to the first tilt surface, the second sidewall being parallel to the light incident surface, and the first sidewall and the second sidewall intersecting with each other in a bottom of the first position slot;

wherein the first sidewall closely abuts against the first tilt surface, and the second sidewall closely abuts against the light incident surface; and wherein the light guiding plate further comprises a second position portion extending from the body towards the plastic frame, the plastic frame has a contact portion corresponding to the second position portion, and the second position portion closely abuts against the contact portion.

12. The liquid crystal device as claimed in claim 11, wherein the second position portion includes a second tilt surface extending from a top of the body towards a top edge of the light incident surface, the contact portion comprises a contact surface parallel to the second tilt surface, and the contact surface closely abuts against the second tilt surface.

13. The liquid crystal device as claimed in claim 12, wherein the backlight module further comprises a buffer material with reflective attribute, the buffer material is arranged between the contact surface of the plastic frame and the second tilt surface of the light guiding plate.

14. The liquid crystal device as claimed in claim 11, wherein the first position portion and the second position portion are formed by injection molding, and are symmetrically arranged along the length of the light guiding plate.

* * * * *